(12) United States Patent  
Mair et al.

(10) Patent No.: US 9,045,029 B2
(45) Date of Patent: Jun. 2, 2015

(54) AXLE FOR A MOTOR VEHICLE

(75) Inventors: Ulrich Mair, Friedrichshafen (DE); Stephan Pollmeyer, Friedrichshafen (DE); Martin Munster, Munich-Laim (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/131,981

(22) PCT Filed: Jun. 27, 2012

(86) PCT No.: PCT/EP2012/062400
§ 371 (c)(1),
(2), (4) Date: Jan. 10, 2014

(87) PCT Pub. No.: WO2013/013920
PCT Pub. Date: Jan. 31, 2013

(65) Prior Publication Data
US 2014/0138171 A1     May 22, 2014

(30) Foreign Application Priority Data

Jul. 28, 2011   (DE) .......................... 10 2011 080 037

(51) Int. Cl.
*B60K 7/00* (2006.01)
*B60K 1/00* (2006.01)
(Continued)

(52) U.S. Cl.
CPC ................. *B60K 1/00* (2013.01); *B60K 7/0007* (2013.01); *B60G 7/001* (2013.01); *B60G 7/008* (2013.01); *B60G 21/051* (2013.01); *B60B 35/003* (2013.01); *B60G 2200/422* (2013.01); *B60G 2204/1244* (2013.01);
(Continued)

(58) Field of Classification Search
USPC ............................ 180/54.1, 65.1–65.31, 165; 903/904–906
See application file for complete search history.

(56) References Cited

U.S. PATENT DOCUMENTS 5,899,475 A * 5/1999 Verhaeg et al. ............ 280/250.1
7,270,204 B2 * 9/2007 Taniguchi et al. ......... 180/65.51
(Continued)

FOREIGN PATENT DOCUMENTS

DE       100 55 751 A1    5/2002
DE    10 2011 009 040 A1  8/2011
(Continued)

OTHER PUBLICATIONS

German Search Report Corresponding to 10 2011 080 037.9 mailed May 14, 2012.
(Continued)

*Primary Examiner* — John Walters
*Assistant Examiner* — James Triggs
(74) *Attorney, Agent, or Firm* — Davis & Bujold, P.L.L.C.; Michael J. Bujold

(57) ABSTRACT

A vehicle axle, in particular a torsion beam axle for an electric vehicle, with at least one trailing arm on which is arranged a drive unit located close to a wheel, and the drive unit comprises an electric machine and a transmission unit. The drive unit, close to the wheel, has at least one supply line and at least one damper such that the drive unit, close to the wheel, is formed at least partially as a trailing arm and the damper is connected, on at least one side, to the drive unit at least in a single-shear manner and can be connected, on at least the other side, to a body of the electric vehicle. The at least one vehicle axle is utilized on a motor vehicle.

17 Claims, 2 Drawing Sheets

(51) Int. Cl.
    *B60G 7/00*         (2006.01)
    *B60G 21/05*       (2006.01)
    *B60B 35/00*       (2006.01)
    *B60L 3/00*         (2006.01)
    *B60L 11/18*       (2006.01)

(52) U.S. Cl.
    CPC .... *B60G 2204/129* (2013.01); *B60G 2204/201* (2013.01); *B60G 2206/11* (2013.01); *B60G 2206/20* (2013.01); *B60L 3/0061* (2013.01); *B60L 11/1805* (2013.01); *B60L 2220/44* (2013.01); *B60L 2240/36* (2013.01); *B60L 2270/145* (2013.01); *Y02T 10/7005* (2013.01); *B60K 2007/0038* (2013.01); *B60K 2007/0061* (2013.01)

(56) References Cited

U.S. PATENT DOCUMENTS

| | | |
|---|---|---|
| 2004/0238242 A1 | 12/2004 | Honda et al. |
| 2007/0102210 A1 | 5/2007 | Oshidari |
| 2009/0108671 A1 | 4/2009 | Maeda et al. |
| 2011/0132673 A1 | 6/2011 | Kim |
| 2012/0292978 A1 | 11/2012 | Buschjohann et al. |

FOREIGN PATENT DOCUMENTS

| | | |
|---|---|---|
| DE | 10 2011 011 011 A1 | 8/2011 |
| EP | 1 234 761 A2 | 8/2002 |
| EP | 2 036 755 A2 | 3/2009 |
| EP | 2 168 858 A1 | 3/2010 |
| EP | 2 374 648 A2 | 10/2011 |
| FR | 2 726 230 A1 | 5/1996 |
| JP | H11-034965 A | 2/1999 |
| JP | 2003-191883 A | 7/2003 |
| JP | 2005-125888 A | 5/2005 |
| JP | 2005-289288 A | 10/2005 |
| JP | 2005-306090 A | 11/2005 |
| JP | 2005-343354 A | 12/2005 |
| JP | 2006-027310 A | 2/2006 |
| JP | 2009-002165 A | 1/2009 |

OTHER PUBLICATIONS

International Search Report Corresponding to PCT/EP2012/062400 mailed Nov. 5, 2012.
Written Opinion Corresponding to PCT/EP2012/062400 mailed Nov. 5, 2012.

\* cited by examiner

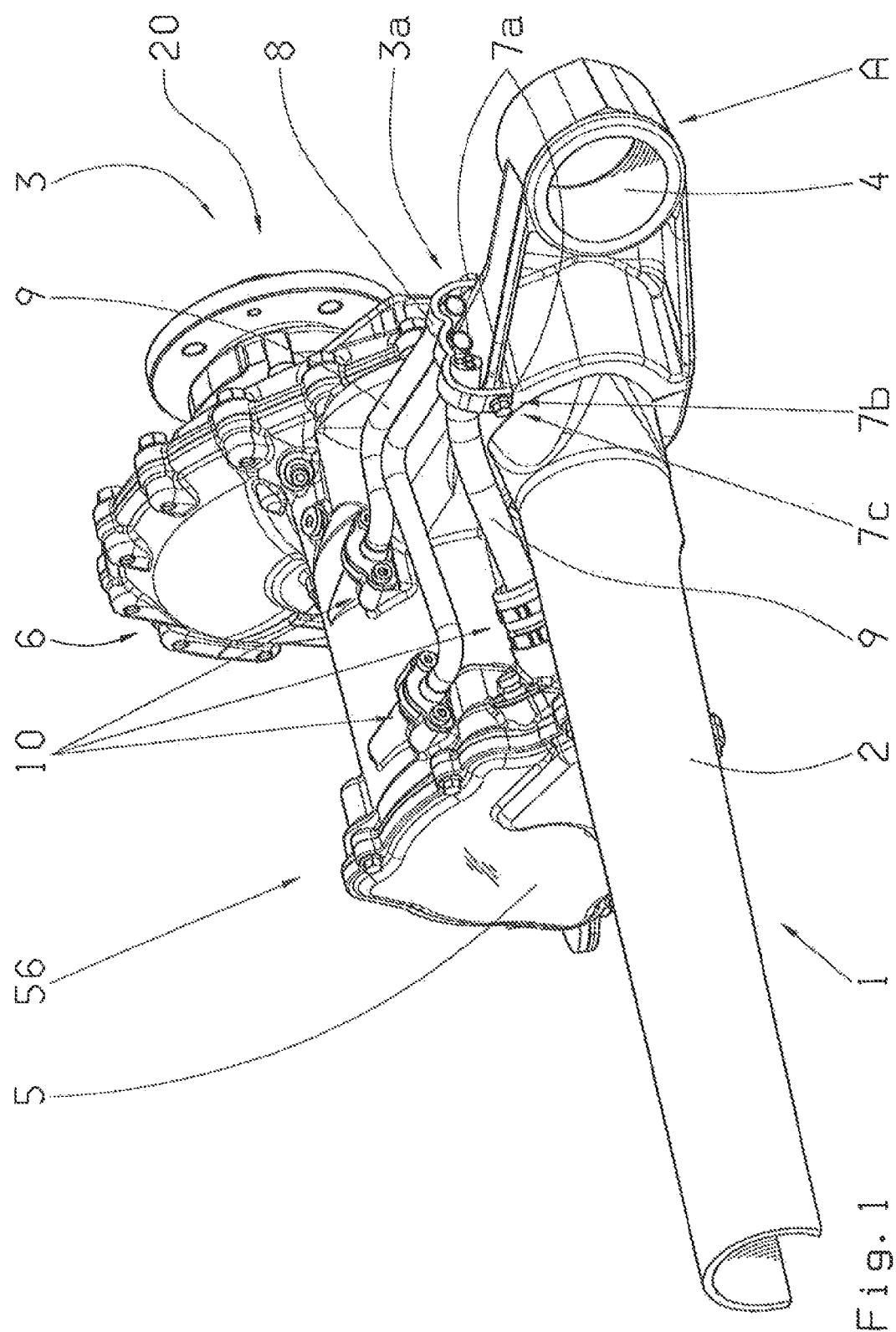

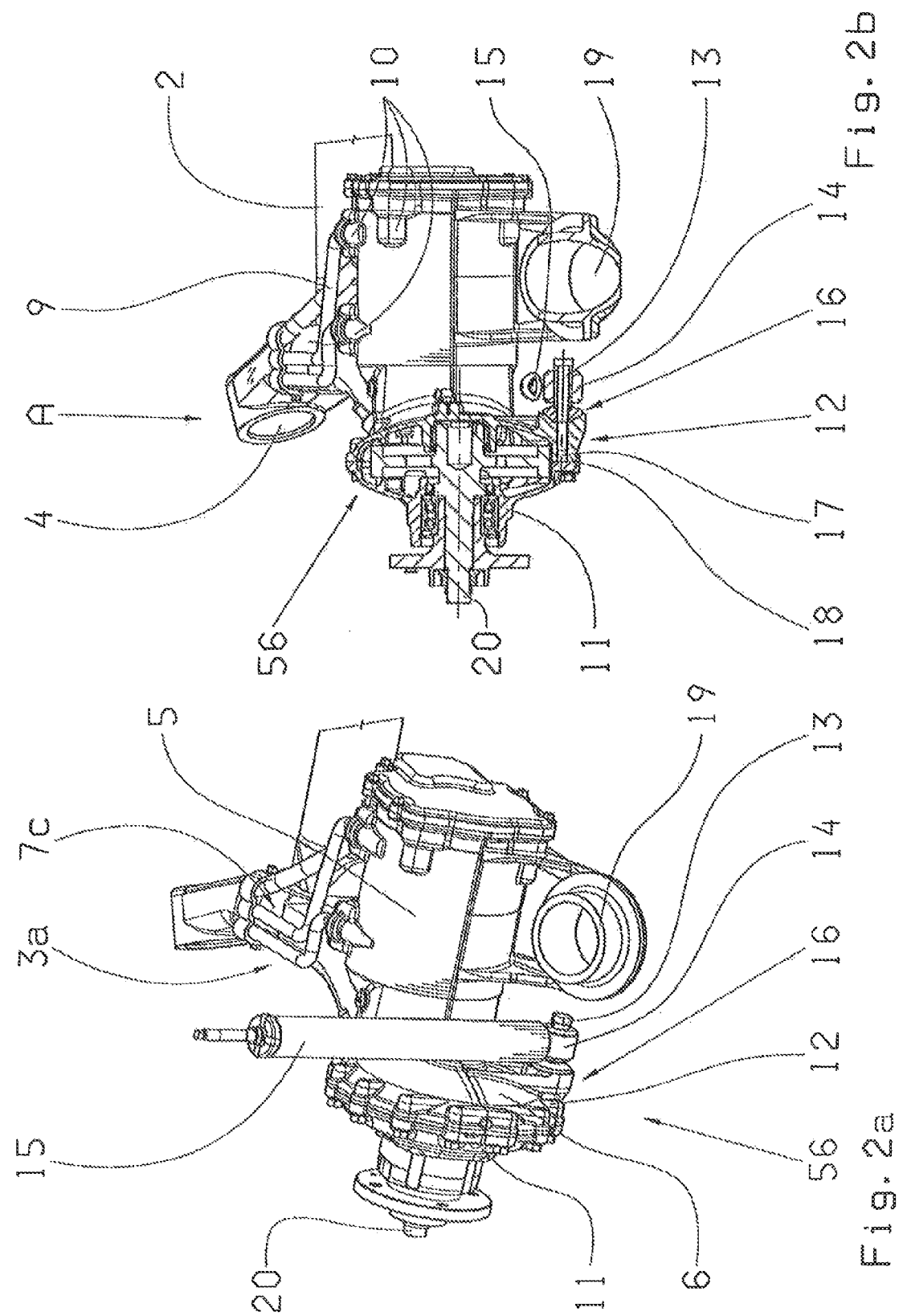

AXLE FOR A MOTOR VEHICLE

This application is a National Stage completion of PCT/EP2012/062400 filed Jun. 27, 2012, which claims priority from German patent application serial no. 10 2011 080 037.9 filed Jul. 28, 2011.

FIELD OF THE INVENTION

The invention concerns a vehicle axle, in particular a torsion beam axle for an electric vehicle, comprising at least one trailing arm on which is arranged, close to a wheel, a drive unit with an electric machine and a transmission unit, such that the drive unit close to the wheel comprises at least one supply line, and with at least one damper. The invention also concerns a motor vehicle with at least one vehicle axle.

BACKGROUND OF THE INVENTION

Such vehicle axles are used in electric vehicles and serve both for the suspension of the electric vehicle wheels concerned and also to drive those wheels. The vehicle axle is supported inter alia by at least one damper on the vehicle body for damping the jouncing movement of the wheel or wheels of the axle. For the drive unit close to the wheel, at least one supply line is usually provided in order to supply electrical energy to its electric machine, for example from accumulators located elsewhere in the electric vehicle.

Owing to the arrangement of the drive unit close to the wheel on the vehicle axle, the drive unit is subjected to severe lifting and impact movements because of the jouncing motions of the electric vehicle wheel concerned.

SUMMARY OF THE INVENTION

One objective of the present invention is therefore to provide a vehicle axle which enables improved damping of the vehicle axle with the drive unit close to the wheel, and at the same time prolongs the useful life of the drive unit close to the wheel.

The invention achieves this objective with a vehicle axle, in particular a torsion beam axle for an electric vehicle, comprising at least one trailing arm on which a drive unit having an electric machine and a transmission unit is arranged close to a wheel, wherein the drive unit close to the wheel has at least one supply line and at least one damper, in that the drive unit close to the wheel is formed at least in part as a trailing arm and on at least one side the damper is connected in single-shear mode to the drive unit and on at least its other side it can be connected to the body of the electric vehicle.

The invention also achieves the objective, in a motor vehicle having at least one vehicle axle, in that the vehicle axle is designed in accordance with the description below.

The advantage achieved with the invention is that it enables an improved force transmission from the vehicle axle to the vehicle body by way of the damper and hence better damping of the electric vehicle as a whole can be provided. Moreover, the structure of the vehicle axle is simple and can therefore be produced inexpensively.

Expediently, the damper is attached to the drive unit in the area of the trailing arm by a conical connection. This has the advantage that if the damper is attached for example by means of a screw, the screw can be tightened with a higher torque. This improves the connection of the damper to the drive unit close to the wheel: more force can be transferred to the damper from the drive unit close to the wheel when the wheel undergoes jouncing movements. In that way improved damping is achieved.

Advantageously, the damper is fixed to the drive unit by a screw joint. This enables an inexpensive and at the same time exceptionally simple connection of the damper to the drive unit close to the wheel.

Expediently, the drive unit has a through-going bore for receiving a screw of the screw joint. If a through-going bore is provided, this allows a maximum screw-in depth for the screw of the screw joint. This makes for a particularly reliable screw joint.

Advantageously, a seal is positioned in the area of the through-going bore. This avoids any escape of oil from the transmission unit of the drive unit close to the wheel via the through-going bore, so that oil from an oil circuit of the transmission unit does not leak out of the through-going bore.

Expediently, the drive unit has a housing with at least two parts, comprising a housing half on the wheel side and one on the trailing arm side, with the through-going bore positioned in the housing half on the trailing arm side. The housing halves are understood to be parts of a two-part housing which do not necessarily have to have the same size, dimensions etc. If the housing half on the wheel side has a threaded bore, the damper can be fixed by means of the screw both to the housing half on the wheel side and to the housing half on the trailing arm side. By virtue of the through-bore in the housing half on the trailing arm side, the latter can also itself be fixed to the wheel-side housing half in a interlocked and frictional manner. This avoids the need for additional fixing together of the wheel-side and trailing-arm-side housing halves in the area of the damper. Likewise, additional connecting elements such as bores, etc., in the two-part housing of the drive unit near the wheel are avoided as much as possible.

Advantageously, the through-bore is formed in both housing halves and a bolt of the screw joint is fixed by means of a nut in the area of the wheel-side housing half. This allows a different material to be used for the screw joint from that used for the housing of the transmission unit and/or the drive unit: a tightening torque of the bolt does not then have to be adapted to suit the housing material of the drive unit on the wheel side, but rather, to suit the material from which the bolt and nut are made. This enables a higher tightening torque to be used, for example if the bolt and nut are made of steel whereas, to save weight, the housing is made of aluminum.

Expediently, the housing with at least two parts is made of aluminum. In this way the weight of the drive unit close to the wheel can be reduced without reducing the rigidity and/or strength of the housing.

Advantageously, the damper is fixed to the drive unit at two points. This enables a more reliable attachment of the damper to the drive unit close to the wheel, and the forces acting on the drive unit close to the wheel due to jouncing movements of the wheel can be damped still more effectively by the damper.

Expediently, a disk spring is arranged on the electric machine in the drive unit and the damper is fixed on one side to the disk spring and on the other side to the wheel-side housing half. This has the advantage that additional components for a two-point connection of the damper to the drive unit near the wheel can be omitted. Accordingly, the vehicle axle can be produced more inexpensively.

Advantageously, at least one fixing means is arranged in the upper area of the trailing arm for connecting the at least one supply line. The supply line can consist for example of cables, fluid-tight tubes, conductors, etc. By arranging the fixing element for the at least one supply line in the upper area of the trailing arm, owing to the small movement of the trailing arm relative to the vehicle body in that area no, or only minimal mechanical loading of the supply line by bending or tension takes place. This prolongs the life of the supply lines.

Expediently, the fixing element comprises a stirrup and/or a clamp. By means of a stirrup the at least one supply line can be fixed extremely inexpensively, while in contrast a clamp enables particularly simple and reliable fixing of the at least one supply line.

Advantageously, the fixing element comprises a screw joint and/or a clip connection. A screw and/or clip connection provides a particularly inexpensive and at the same time easily released connection. For maintenance purposes this can be opened or released, and the at least one supply line can be replaced.

Expediently, a guiding element, in particular a guide groove, is positioned so as to guide the at least one supply line. This further simplifies the fitting of the at least one supply line for the drive unit close to the wheel. At the same time undesired friction is also avoided if a plurality of supply lines move relative to one another and/or are at least partially twisted owing to the to-and-fro movements of the drive unit close to the wheel. Such lines are essentially held in their respective, predetermined positions by the guiding element.

Advantageously, the guiding element is formed on the trailing arm. In this way the guiding element can be produced very inexpensively together with the trailing arm. Additional, costly production processes for the guiding element and/or its attachment to the trailing arm are thereby avoided.

Further important characteristics and advantages emerge from the drawings and the associated figure descriptions that refer to the drawings.

It is understood that the above-mentioned features and those still to be explained below can be used not only in the combination indicated in each case, but also in other combinations or in isolation, without going outside the scope of the present invention.

BRIEF DESCRIPTION OF THE DRAWINGS

Preferred example embodiments of the invention are illustrated in the drawings and explained in more detail in the description that follows, wherein the same indexes refer to the same, similar or functionally equivalent components or elements.

The drawings show, in each case schematically:

FIG. 1: A vehicle axle according to a first embodiment of the present invention, represented in three-dimensions, and FIGS. 2a, 2b: Another three-dimensional view of the vehicle axle according to FIG. 1, and a partial cross-section through the transmission unit of the drive unit close to the wheel, according to FIG. 1.

DETAILED DESCRIPTION OF THE PREFERRED EMBODIMENTS

FIG. 1 shows a vehicle axle according to a first embodiment of the present invention, represented in three dimensions.

In FIG. 1 the index 1 denotes a torsion beam axle. The torsion beam axle 1 has a transverse profile 2 which in FIG. 1 extends essentially from lower left to upper right. On the right-hand side of the transverse profile 2 is arranged a trailing arm 3. In this case the trailing arm 3 can swivel about a pivot point A on a body of an electric vehicle. Not shown are dampers by virtue of which the torsion beam axle is damped. When the wheel undergoes a jouncing movement the trailing arm 3 pivots about the pivot point A. On the side opposite the fixing eye 4 is arranged a drive unit 56 close to the wheel, which is itself at least partially formed as the trailing arm 3. The drive unit 56 comprises an electric motor 5 and a transmission unit 6. The driveshaft of the electric motor 5 is connected to a wheel shaft 20 by way of the transmission unit 6. The wheel shaft 20 serves to drive a wheel of the electric vehicle. The driveshaft of the electric motor 5 is positioned substantially parallel to the torsion beam axle 1, as also is the wheel shaft 20.

On the upper side of the electric motor and essentially perpendicular to the torsion beam axle 1 are arranged two connections 10, to which in turn are connected supply lines 9 for supplying the drive unit near the wheel with electrical energy and for providing a coolant for cooling the electric motor 5. On the upper side 3a of the trailing arm 3 and in the end area of the transverse profile 2, bores 7b are provided parallel to the extension of the transverse profile 2. Between the bores 7b, a strap bracket 8 can be arranged and fixed by means of screws 7a in the bores 7b. The strap bracket 8 serves to clamp the supply lines 9 fast in the area of the torsion beam axle 1, so that as little loading as possible by bending or tension is imposed on the supply lines 9 when the trailing arm swivels about the pivot point A.

The bores 7b can be made as threaded holes. The bores 7b can also be arranged directly in the area of the trailing arm 3. Likewise it is possible, instead of the stirrup bracket, to provide a clamp which surrounds the profile of the trailing arm 3 at least partially, preferably completely, and so fixes the supply lines 9 in the upper part 3a of the trailing arm 3. Finally, the supply lines 9 are also at least partially fixed on the upper side of the trailing arm 3 by means of guide grooves 7c. The guide grooves 7c serve on the one hand to prevent the supply lines 9 from rubbing against one another and being damaged during a jouncing movement of the torsion beam axle 1. On the other hand, the guide groove 7c enables simpler fitting of the strap bracket 8, since the supply lines 9 are held in predetermined positions and can then be fixed more easily by means of the strap bracket 8. In FIG. 1 the strap bracket 8 is provided with concavities or an undulating cross-section profile, so that the supply lines 9 are also held essentially fixed in their desired position by the strap bracket 8 during jouncing movements of the torsion beam axle 1.

FIG. 2a now shows the torsion beam axle 1, looking toward the drive unit 56. As already explained earlier, the drive unit 56 comprises a transmission unit 6. The transmission unit 6 has a two-part housing 11, 12 with a housing 11 on the wheel side and a trailing arm housing 12. In the lower area of the trailing arm housing 12, the damper 15 is fixed by way of a fixing eye 14 to the trailing arm housing 12 with a screw 13. In particular, the damper 15 is screwed by the screw 13 via a conical joint 16 to the trailing arm housing 12. In the area of the electric motor 5 there is arranged, furthermore, a spring plate 19 that stands perpendicular to the wheel shaft 20 on the side facing away from the transverse profile 2, i.e. on the side where the damper 15 is. The spring plate 19 serves to hold a spring which is then fixed to the body of the electric vehicle as is the damper 15, to damp the movement of the wheel of the electric vehicle or that of the torsion beam axle 1. In FIG. 2a the damper 15 is fixed to the trailing arm housing 12 at one point. It is likewise possible for the damper 15 to be fixed at two points, namely on the one hand to the trailing arm housing 12 and on the other hand to the spring plate 19 by friction force. This enables an even more reliable connection of the damper 15 to the drive unit 56 near the wheel and thus also to the torsion beam axle 1.

FIG. 2b now shows the drive unit 56 close to the wheel, in the area of the transmission unit 6, in cross-section. In the lower area of the transmission unit 6, the fixing eye 14 for the damper 15 can be seen. The screw-bolt 13 is screwed through the damper 15, the eye 14 and the through-bore 17, into a threaded bore 17a milled into the wheel-side housing 11 so that the damper 15 is fixed by friction force to the drive unit 56 close to the wheel and the trailing arm 3. The screw joint 13 is in this case made as a conical joint.

Instead of the threaded bore 17a in the wheel-side housing 11 another through-bore can be formed in the wheel-side housing 11. The screw 13 then passes all the way through the fixing eye 14, the damper 15, the through-bore 17 in the trailing arm housing 12 and the through-bore in the wheel-side housing 11, and is fixed on the side of the wheel-side housing 11 by means of the nut 20.

To avoid any escape of oil via the through-bore 17 and the threaded bore 17a, a gasket seal is positioned between the wheel-side housing 11 and the trailing arm housing 12.

In summary the invention has, among others, the advantage that on the one hand connection lines for a drive unit next to the wheel can be arranged in the area of the vehicle axle in such manner that they are subjected to the least possible mechanical loading due to jouncing movements of the wheel of the vehicle axle. This substantially prolongs the life of the supply lines and improves their attachment to connection points on the drive unit near the wheel. Moreover, the invention has the advantage of enabling simple, inexpensive and reliable connection of a damper to a drive unit close to a wheel of an electric vehicle.

Although the present invention has been described above with reference to preferred example embodiments, it is not limited to them but can be modified in many ways.

INDEXES

1 Torsion beam axle
2 Transverse profile
3 Trailing arm
3a Upper side of trailing arm
4 Eye at attachment point to the vehicle body
5 Electric motor
6 Transmission unit
56 Drive unit
7a Screw-bolts
7b Bores
7c Guide groove
8 Strap bracket
9 Supply line
10 Connection
11 Housing on the wheel side
12 Housing on the trailing arm side
13 Screw-bolt
14 Damper eye
15 Damper
16 Conical joint
17 Through-bore
17a Threaded bore
18 Seal
19 Spring plate
20 Wheel shaft
A Pivot point

The invention claimed is:

1. A vehicle axle (1) for an electric vehicle, the vehicle axle comprising:
a drive unit (56), having an electric machine (5) and a transmission unit (6), being arranged on at least one trailing arm (3),
the drive unit (6) having at least one supply line (9) and at least one damper (15),
the drive unit (56) being formed at least partially as a trailing arm (3), and
the damper (15) being connected on at least a first side to the drive unit (56) at least in a single-shear manner, and the damper (15) being connectable on at least a second side to a body of the electric vehicle.

2. The vehicle axle (1) according to claim 1, wherein the damper (15) is fixed to the drive unit (56), in an area of the trailing arm (3), by a conical joint (16).

3. The vehicle axle according to claim 2, wherein the damper (15) is fixed to the drive unit (56) by a screw joint (13).

4. The vehicle axle according to claim 1, wherein the damper (15) is fixed to the drive unit (56) by a screw joint and the drive unit (56) has a through-bore (17) for receiving a screw-bolt (13) of the screw joint.

5. The vehicle axle according to claim 4, wherein a seal (18) is arranged in an area of the through-bore.

6. The vehicle axle according to claim 4, wherein the drive unit (56) has an at least two-part housing (11, 12) which comprises a first housing half on a wheel-side (11) and a second housing half on a trailing arm-side (12), and the through-bore (17) is formed at least in the second housing half (12) on the trailing arm side.

7. The vehicle axle according to claim 6, wherein the through-bore (17) is formed in both the first and the second housing halves (11, 12), and the screw-bolt (13) of the screw joint is fixed by a nut in the area of the first housing half (11) on the wheel-side.

8. The vehicle axle according to claim 6, wherein the at least two-part housing (11, 12) is made of aluminum.

9. The vehicle axle according to claim 1, wherein the damper (15) is fixed to the drive unit (56) at two points.

10. The vehicle axle according to claim 9, wherein a spring plate (19) is arranged on the electric machine (5) of the drive unit (56), and the damper (15) is fixed, on one side, to the spring plate (19) and fixed, on the other side, to a first housing half (11) on a wheel-side.

11. The vehicle axle according to claim 1, wherein at least one fixing element (7a, 7b, 8) is arranged in an upper area of the trailing arm (3) on a pivoting joint (4), between the trailing arm and the vehicle body, for fixing the at least one supply line (9).

12. The vehicle axle according to claim 11, wherein the fixing element (7a, 7b, 8) comprises at least one of a strap bracket (8) and a clamp.

13. The vehicle axle according to claim 11, wherein the fixing element (7a, 7b, 8) comprises at least one of a screw joint and a clip connection.

14. The vehicle axle according to claim 1, wherein a guiding element (7c) is arranged so as to guide the at least one supply line (9).

15. The vehicle axle according to claim 14, wherein the guiding element (7c) is formed on the trailing arm (3).

16. A motor vehicle in combination with at least one vehicle axle (1), the vehicle axle comprising:
a drive unit (56), having an electric machine (5) and a transmission unit (6), being arranged on at least one trailing arm (3),
the drive unit (56) having at least one supply line (9) and at least one damper (15), the drive unit (56) being formed at least partially as a trailing arm (3) and the damper (15) being connected, on at least a first side, to the drive unit (56) at least in a single-shear manner, and the damper (15) being connectable on at least a second side to a body of the motor vehicle.

17. A torsion beam axle for an electric vehicle, the torsion beam axle comprising:
  at least one trailing arm,
  a drive unit being arranged on the trailing arm adjacent a vehicle wheel,
  the drive unit having an electric machine and a transmission unit,
  the drive unit having at least one supply line and at least one damper,
  the drive unit being formed at least partially as the trailing arm, and
  one end of the at least one damper being coupled to the drive unit by a single-shear connection, and an opposite end of the at least one damper being connected to a body of the electric vehicle.

* * * * *